J. N. FROST.
MANURE PULVERIZER AND LOADER.
APPLICATION FILED MAY 8, 1908.
909,576.
Patented Jan. 12, 1909.
3 SHEETS—SHEET 3.
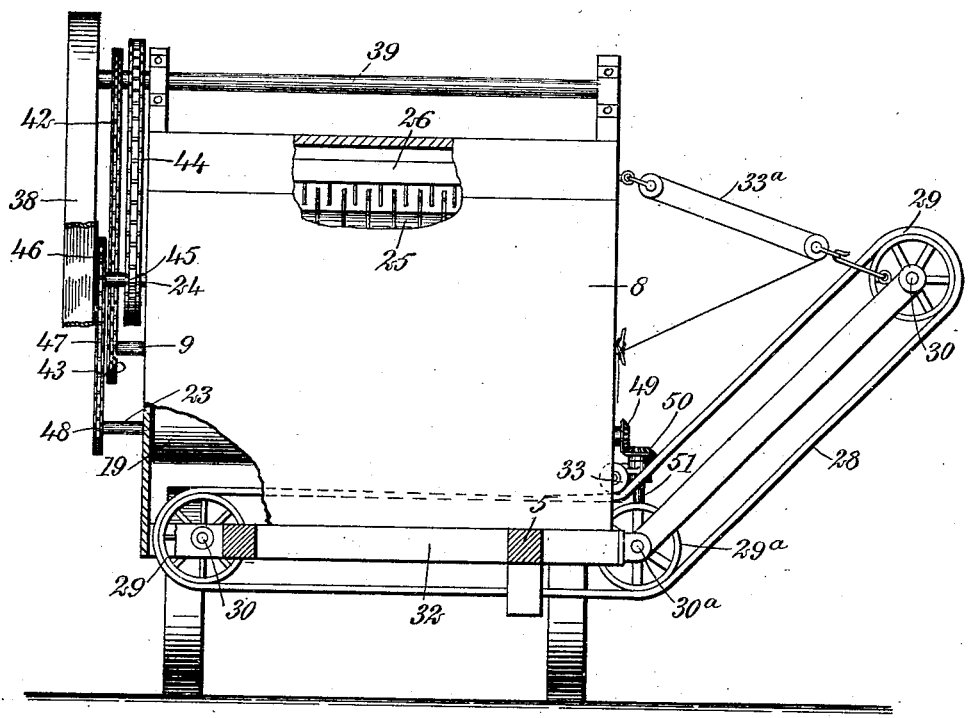
WITNESSES
INVENTOR
John Newton Frost
BY
ATTORNEYS

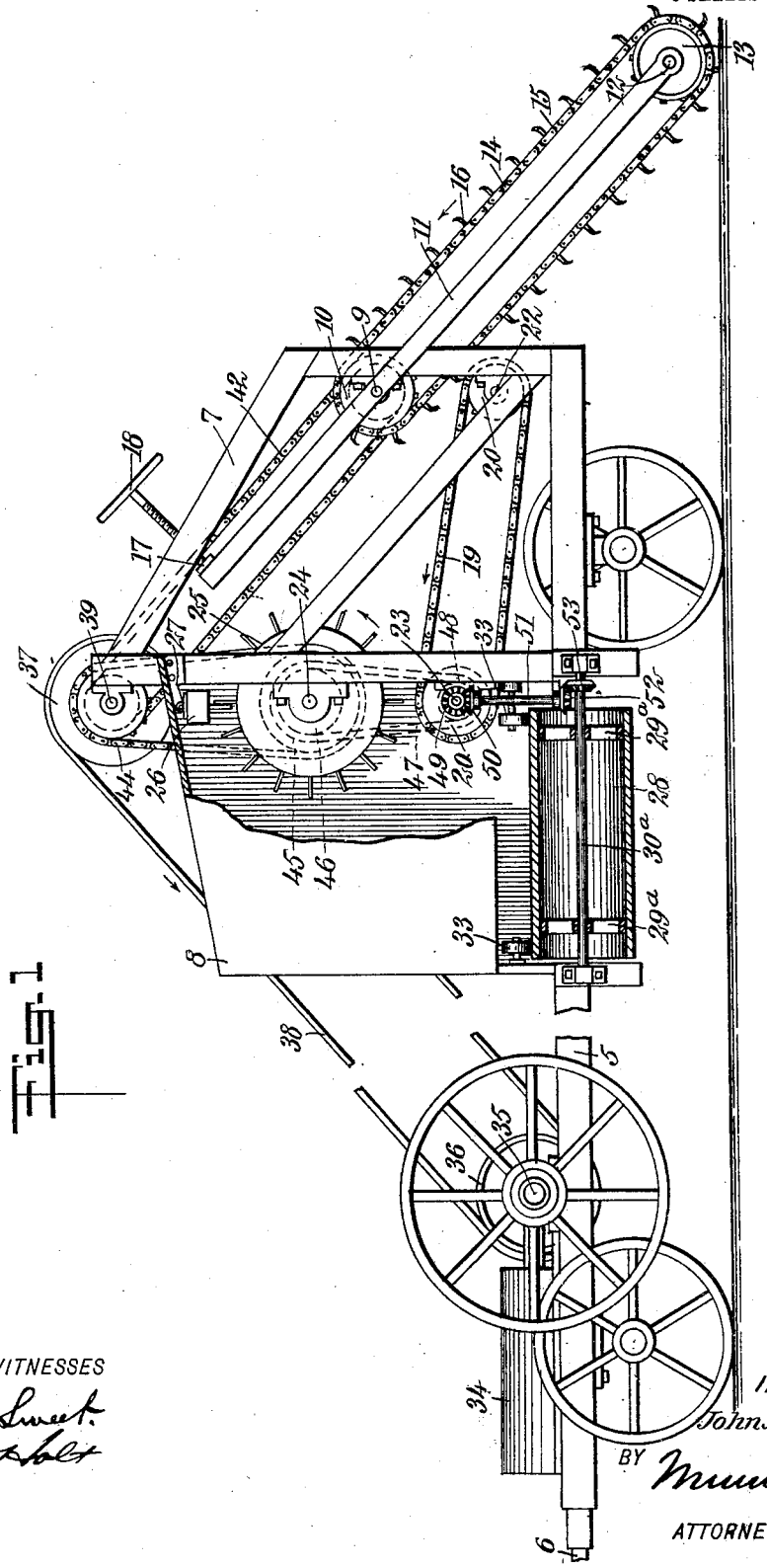

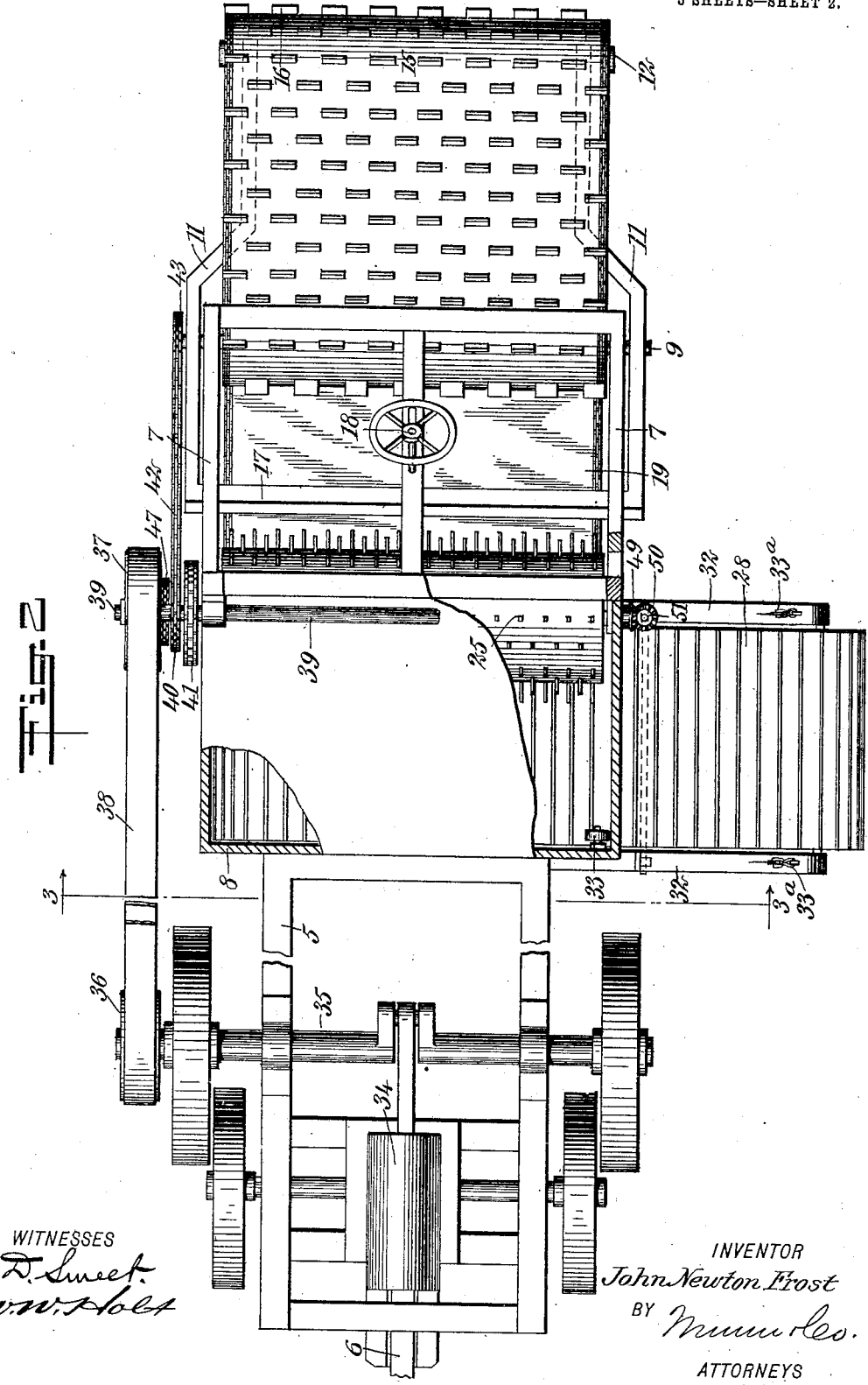

UNITED STATES PATENT OFFICE.

JOHN NEWTON FROST, OF ARLINGTON, MASSACHUSETTS.

MANURE PULVERIZER AND LOADER.

No. 909,576.	Specification of Letters Patent.	Patented Jan. 12, 1909.

Application filed May 8, 1908. Serial No. 431,556.

*To all whom it may concern:*

Be it known that I, JOHN NEWTON FROST, a citizen of the United States, and a resident of Arlington, in the county of Middlesex and State of Massachusetts, have invented a new and Improved Manure Pulverizer and Loader, of which the following is a full, clear, and exact description.

The invention relates to a portable machine for pulverizing and loading or piling fertilizer, principally manure, preparatory to spreading it over the ground.

Machines prior to my invention for pulverizing manure, so far as I am aware, are all designed to spread the manure over the ground as the pulverizing operation takes place. This I find to be objectionable not only for the reason that it is inconvenient to keep the machine supplied from the pit or other place where the fertilizer is stored, but also from the fact that the distribution cannot always be satisfactorily made. I aim to overcome these objections by providing a machine which may be placed convenient to the point of supply, and will operate to pulverize the fertilizer and then load it into a vehicle to be hauled to the points desired.

I preferably carry out the invention in a general way by providing a carriage on which the pulverizing mechanism is mounted. This mechanism is fed by an elevator arranged at the rear end of the carriage, and the said mechanism discharges upon a conveyer leading to one side of the carriage, the mechanism, elevator and apron all being driven from a motor mounted on the carriage.

Reference is to be had to the accompanying drawing forming a part of this specification, in which similar characters of reference indicate corresponding parts in all the views.

Figure 1 is a side elevation of a machine embodying my invention, partly in section. Fig. 2 is a plan of the same, partly in section; and Fig. 3 is a cross-section through the machine substantially on the line 3—3 of Fig. 2, looking in the direction of the arrows.

Specifically described, the machine embodies in its construction a wheel-supported bed frame 5 having a tongue or other draft appliance 6 at one end and constituting the carriage of the apparatus.

At the rear end of the carriage at opposite sides are rigidly attached and secured together, upright frames 7, the top beams of which incline upwardly and forwardly, and the space at the front of the frames 7 is inclosed to about the same extent by a casing 60 8. Between the frames 7, about midway their height, at the rear of the carriage, is journaled a cross shaft 9 having sprocket wheels 10 fixed near each end within the frames. Also carried on this shaft, adjacent 65 to the sprocket wheels, are side bars 11, in the outer ends of which is journaled a shaft 12 carrying sprocket wheels 13 over which and the sprocket wheels 10, pass chains 14 rigidly secured at the edges of an apron 15, 70 the latter being provided with the usual cross pieces 16 and forming the feed elevator of the machine. The side bars 11 are extended forwardly of the sprocket wheel 10, where they are connected, as shown in Fig. 75 2, by a cross bar 17, against which bears, near its center, a screw 18, threaded through a nut carried by a beam between the two frames 7. This screw serves to lower the elevator and raise it above the ground, as 80 when the carriage is in transit. Also arranged between the frames 7, and below the elevator, is a conveyer running substantially the full length of the frames longitudinally of the carriage, consisting of an apron 19 85 slightly inclined upwardly in a forward direction and passing over sprocket wheels 20 attached to cross shafts 22 and 23, respectively arranged and journaled in bearings carried by the rear and forward ends of the 90 said frames. Journaled in suitable bearings directly above the shaft 23 is a shaft 24 carrying a spiked or toothed drum 25, the spikes or teeth of which pass between similar teeth or spikes carried by a relatively 95 heavy cross bar 26, the latter being pivotally supported at its top as indicated at 27.

A transversely-arranged discharge conveyer forms the bottom of the casing 8 and extends some distance therebeyond at one 100 side of the carriage, as shown in Fig. 2, the said conveyer consisting of the usual apron 28 passing over wheels 29, each fixed to a shaft 30, the shafts being journaled in the opposite ends of extended cross beams 32. 105 Each beam 32 is made in two sections, with the outer section pivoted to the inner section adjacent to the casing 8 on a shaft 30$^a$, which carries wheels 29$^a$, corresponding to the wheels 29. That side of the casing 8 through 110 which the apron 28 passes is cut away at its bottom portion a sufficient distance for the discharge of the pulverized fertilizer, as best shown in Fig. 1, and the apron is held down to the wheels 29ᵃ adjacent to this opening by rollers 33. The inclination of the pivotal portion of the discharge conveyer is adjusted by a block and tackle 33ᵃ attached to its outer end and to a fixed part of the machine.

On the carriage, preferably at the front of the casing, is carried a motor 34, of the internal combustion type, which has a driving shaft 35 provided with the usual balance wheels and the driving pulley 36. This pulley is connected with a pulley 37 by a belt 38, the pulley 37 being fixed to a cross shaft 39 journaled in bearings carried on the upper and forward portions of the frames 7. Also secured to the shaft 39 are sprocket wheels 40 and 41, the former driving by a chain 42, a sprocket wheel 43, fixed to the extended end of the shaft 9. The sprocket wheel 41 drives by a chain 44, a sprocket 45 fixed to the extended end of the shaft 24. Also fixed to the extended portion of the shaft 24 is a sprocket 46, which drives by a chain 47, a sprocket wheel 48, fixed to the extended end of the shaft 23. The opposite end of this shaft is also extended to a point opposite the center of the wheels 29ᵃ, supporting the intermediate portion of the apron 28, where it is provided with a bevel gear 49 in mesh with a similar gear 50 carried at the upper end of a vertical shaft 51. The lower end of the shaft 51 also carries a bevel gear 52 which meshes with a bevel gear 53 fixed to the shaft 30ᵃ. By this manner of intergearing the several working parts of the machine together it is seen that on starting the motor, the elevator, feed conveyer, spiked drum, and the discharge conveyer are set in motion.

In the operation of the machine it is driven to a point where the pulverizing is to take place, usually the manure pit, when the elevator is lowered by the screw near to the ground and the motor started. The fertilizer is shoveled on the apron of the elevator which discharges it on the apron 19 of the feed conveyer moving in the direction of the arrow. As the fertilizer reaches the forward portion of this conveyer, the teeth or spikes of the drum moving in the opposite direction gather it up and carry it around between the teeth of the heavy cross bar 26, where it is thoroughly pulverized and drops to the bottom of the casing on the apron 28 of the loader. Should a rock, brick or other solid piece of material be fed in with the fertilizer and carried by the teeth of the drum against the teeth of the cross beam, the latter will swing to one side and permit it to pass, by reason of the pivotal connection of the cross beam. The cart or other vehicle which is to haul the fertilizer to the points desired is backed up under the projecting end of the discharge conveyer, where it remains until loaded. In this way the fertilizer may be pulverized convenient to the point where it is stored, and then distributed over the field in the thickness and at the points desired.

Having thus described my invention, I claim as new and desire to secure by Letters Patent:

1. A fertilizer pulverizer and loader, comprising a carriage, a pulverizing mechanism mounted on the carriage, means for feeding the fertilizer to said mechanism at the end of the carriage, and means for discharging the fertilizer at one side thereof.

2. A fertilizer pulverizer and loader, comprising a carriage, a mechanism carried by the carriage for pulverizing the fertilizer, and means for loading the fertilizer into a vehicle after passing through said mechanism.

3. A fertilizer pulverizer and loader, comprising a carriage, a mechanism carried by the carriage for pulverizing the fertilizer, an elevator at one end of the carriage for feeding the fertilizer to said mechanism, and a conveyer arranged transversely of the carriage and projecting from one side thereof for loading the fertilizer into a vehicle after passing through said mechanism.

4. In a fertilizer pulverizer and loader, a carriage, a mechanism carried by the carriage for breaking up the fertilizer, an elevator for feeding the fertilizer to said mechanism, and a conveyer leading from said mechanism for loading the fertilizer into a vehicle.

5. A fertilizer pulverizer and loader, comprising a carriage, an elevator for feeding the fertilizer arranged at the end of the carriage, a spiked drum revolubly mounted on the carriage, a conveyer for feeding the fertilizer from the elevator to the spiked drum, a pivoted beam having spikes on its under face projecting into the intervals between the spikes carried by the drum, and a discharge conveyer carried by the carriage below the drum.

6. In a fertilizer pulverizer and loader, a carriage having vertically-arranged frames arranged at opposite sides at its rear end, an elevator for feeding the fertilizer pivotally supported between said frames, means for adjusting the elevation of the outer end of the elevator, a feed conveyer on which the elevator discharges arranged between said frames, a casing carried by the carriage forward of the frames, a spiked drum revolubly mounted above the feed conveyer, a beam pivotally supported having spikes projecting into the intervals between the spikes of the drum, and a second conveyer forming the bottom of the casing, on which said drum discharges.

7. In a fertilizer pulverizer, the combination of a conveyer movable in one direction, a spiked drum arranged directly above the conveyer and revoluble in the opposite direction, and means having spikes projecting into the intervals between the spikes of the drum.

8. In a fertilizer pulverizer, a spiked drum, means for revolving the drum in one direction, and means for feeding the fertilizer to the drum in the opposite direction.

9. In a fertilizer pulverizer, a spiked drum, a pivoted beam having spikes projecting into the intervals between the spikes of the drum, means for revolving the drum in one direction, and means for feeding the fertilizer to the drum in the opposite direction.

10. A fertilizer pulverizer and loader, comprising a carriage, a pulverizing mechanism mounted on said carriage, means for feeding the fertilizer to said mechanism at one end of the carriage, means for discharging the fertilizer at one side of the carriage after passing through said mechanism, and a motor mounted on the carriage for driving both the said means and mechanism.

11. A fertilizer pulverizer and loader, comprising a carriage, an elevator for feeding the fertilizer adjustably mounted at the rear of the carriage, a conveyer leading from the elevator, means for breaking up the fertilizer arranged over the conveyer, a second conveyer for receiving the fertilizer from said means and discharging it at one side of the carriage, and a motor mounted on the carriage for driving said elevator, conveyers and means.

12. A fertilizer pulverizer and loader, comprising a carriage, a casing carried by the carriage, means for pulverizing the fertilizer and discharging it within the casing, and a conveyer forming the bottom of the casing and extended beyond one side of the carriage for receiving and loading the pulverized fertilizer on a vehicle.

In testimony whereof I have signed my name to this specification in the presence of two subscribing witnesses.

JOHN NEWTON FROST.

Witnesses:
 JOHN G. BRACKETT,
 ARTHUR J. WELLINGTON.